United States Patent

Benktander et al.

Patent Number: 5,125,845
Date of Patent: Jun. 30, 1992

[54] ELECTRICAL PLUG-IN CONNECTION FOR SENSOR ON BEARINGS

[75] Inventors: Sven Benktander, Paternostergatan, Sweden; Heinz Kiener, Waigolshausen; Jürgen Kober, Lucretiastr, both of Fed. Rep. of Germany

[73] Assignee: SKF GmbH, Schweinfurt, Fed. Rep. of Germany

[21] Appl. No.: 672,745

[22] Filed: Mar. 21, 1991

Related U.S. Application Data

[63] Continuation of Ser. No. 439,877, Nov. 21, 1989, abandoned.

[30] Foreign Application Priority Data

Nov. 24, 1988 [DE] Fed. Rep. of Germany ....... 3839557

[51] Int. Cl.[5] .............................................. H01R 13/66
[52] U.S. Cl. ........................................ 439/16; 439/34; 384/448
[58] Field of Search ..................... 384/448; 439/16, 34

[56] References Cited

U.S. PATENT DOCUMENTS

| | | | |
|---|---|---|---|
| 4,783,180 | 11/1988 | Hayashi | 384/448 |
| 4,875,785 | 10/1989 | Santos et al. | 384/448 |
| 4,884,901 | 12/1989 | Harsdorff | 384/448 |
| 4,938,612 | 7/1990 | Yamada | 384/448 |
| 4,946,295 | 8/1990 | Hajzler | 384/448 |
| 4,946,296 | 8/1990 | Olschewski et al. | 384/448 |
| 4,948,277 | 8/1990 | Alff | 384/448 |
| 4,960,333 | 10/1990 | Faye et al. | 384/448 |
| 4,968,156 | 11/1990 | Hajzler | 384/477 |
| 4,978,234 | 12/1990 | Ouchi | 384/448 |
| 4,988,219 | 1/1991 | Peilloud | 384/448 |
| 5,017,868 | 5/1991 | Hajzler | 384/448 |

FOREIGN PATENT DOCUMENTS

2207470 2/1989 United Kingdom ............... 384/448

OTHER PUBLICATIONS

"Sensing Wheel Speed", Jun. 1988, Automotive Engineering, pp. 67-73.

*Primary Examiner*—Gary F. Paumen
*Attorney, Agent, or Firm*—Rosen, Dainow & Jacobs

[57] ABSTRACT

An electrical connection, preferably for ALS sensors incorporated in wheel bearings, is installed coaxially on the wheel bearing and its side surface. It is equipped, for example, with slip rings which operate in conjunction with the electrical contacts of the ALS sensor which is solidly attached to the wheel bearing. This simplifies the manufacture and handling of the wheel bearing during transportation and assembly. In particular, the risk of damage to the connecting cord is reduced during operation.

5 Claims, 2 Drawing Sheets

ELECTRICAL PLUG-IN CONNECTION FOR SENSOR ON BEARINGS

This application is a continuation of application Ser. No. 439,877, filed Nov. 21, 1989, now abandoned.

BACKGROUND OF THE INVENTION

The invention relates to bearing sensors and more particularly to a device for an electrical connection for a bearing sensor. This invention is related to a copending patent application "Device For The Electrical Connection Of Sensors On Bearings," Ser. No. 439,789, filed Nov. 21, 1989, having a common assignee.

Sensors for antilocking systems (ALS) are increasingly incorporated in bearing units or bearings for vehicle wheels, such as truck wheels or the like. They are combined with seals, retaining rings, and other similar related devices and connected to the non-revolving bearing ring. The revolving bearing ring is further equipped with a pulse ring which activates the sensor so that during a revolution a series of electrical pulses is supplied to an electronic control. Because of the incorporation into the bearing, it is usually the manufacturer's responsibility to have the component built in. In addition, the component must be supplied with a sufficiently long cord attached to the bearing. Often these connecting cords are damaged or torn off during transportation or assembly at the customer's plant, because the bearing or the bearing unit are usually heavy or sturdy compared to the weakness of the connecting cord and handling is not very careful. Through the use of plug-in connectors however, the built-in length of the connecting cord can be reduced.

There is not usually sufficient space available for a fixed plug-in connector in or on a bearing according to known electrical wiring techniques because, again, the handling and especially the susceptibility to outside disturbances during operation require a sturdy and therefore space-consuming plug-in connector.

In addition, it should be kept in mind with rolling bearings that even an immobile bearing ring may be induced to revolve through the momentum affecting the rolling bearing and that it will, as a result, due to a defective fit or because of changing seat conditions after long-term operation, move over the seat surface or start creeping. On account of this unforeseen revolving motion the connectors of known embodiments will rip because they are solidly attached to the bearing ring with or without a plug-in connection and, consequently, they will revolve with it. As a result, the operation of the antilocking system will be interrupted.

It is according the object of the invention to provide an electrical connection of the type mentioned above, which excludes damage to the connectors during transportation as well as during the assembly and operation, thus securing error-free operation of the ALS system.

SUMMARY OF THE INVENTION

The foregoing object is achieved by an axially insertable connection ring which extends coaxially to the bearing.

The connection ring is made, for example, of a synthetic material and is attached to the side of the bearing. It has the same axis as the bearing and is installed on the seat surface for the bearing or on a shoulder of the carrier element involved. The sensor is incorporated in the bearing in order to ensure an accurate and, for reasons of mass production, consistent assembly with optimum adjustment. In particular, this will make it possible to ensure, for the same electric pulse, a smaller and even gap between the sensor and the pulse ring viewed over one revolution.

The connection ring, together with the connecting cord, transfers the electric pulses to the electronic control, can be detached from the bearing. Consequently it can be a component of the electronic control and be solidly attached to it by way of the connecting cord. It is incorporated or attached only during the assembly of the bearing, e.g., at the car plant. Thanks to the solution according to the invention it is not necessary to provide a connecting cord at the bearing plant. This simplifies greatly all handling, storage and transportation. In addition, the possibility of damage is reduced to a minimum. The same advantages exist when the bearing is built in. For example, the connection ring already equipped with the connecting cord is first slid over the shaft before the bearing is installed in the usual manner. Again, the potential for damage or erroneous incorporation is slight.

Any possible wandering—referred to above—of the non-revolving bearing ring over its seat in a circumferential direction will have no effect on the connecting cord because the coaxially installed ring has its own seat surface, and because it is only connected to the side of the bearing and can therefore not be displaced by rotation. Accordingly, the connecting cords will no longer be torn off or damaged.

DESCRIPTION OF THE DRAWINGS

The last-mentioned advantages are obtained in particular with the help of further characteristics of the invention which are described hereafter with the aid of the examples shown in the drawings; wherein.

DETAILED DESCRIPTION OF THE INVENTION

Figure 1:
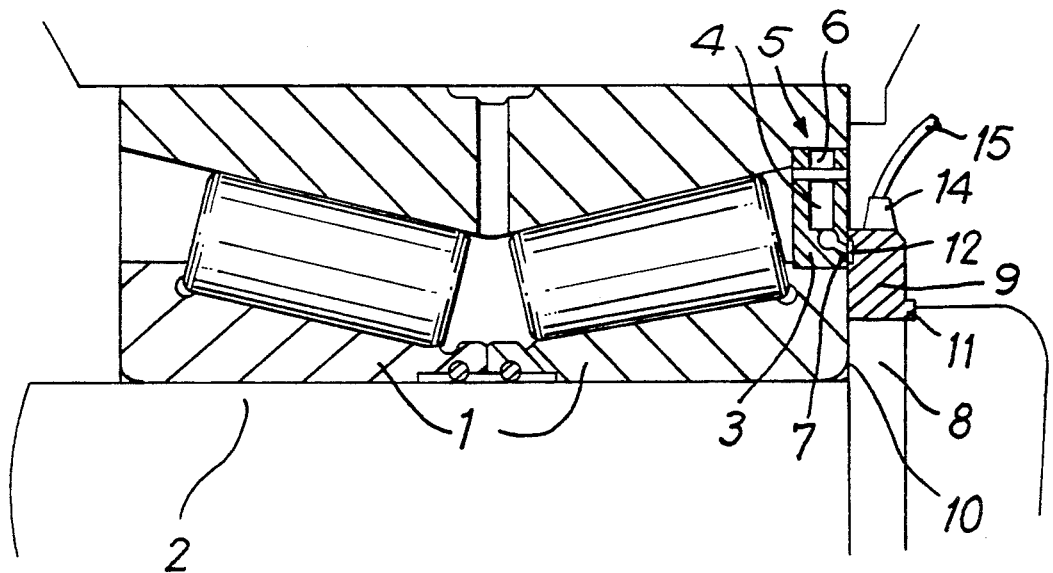
FIG. 1 shows part of a longitudinal section of a bearing with a built-in ALS sensor and attached connection ring with slip rings installed on the side.
Figure 2:
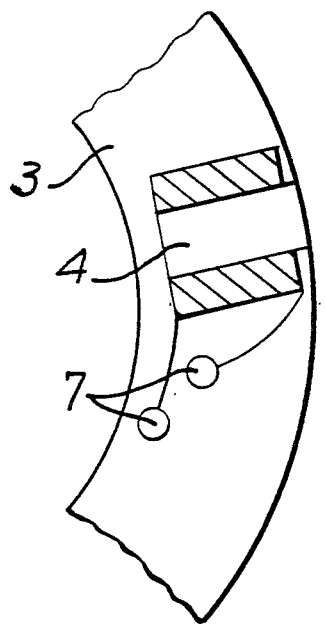
FIG. 2 shows part of a side view of the ALS sensor according to FIG. 1, embedded in a ring.
Figure 3:
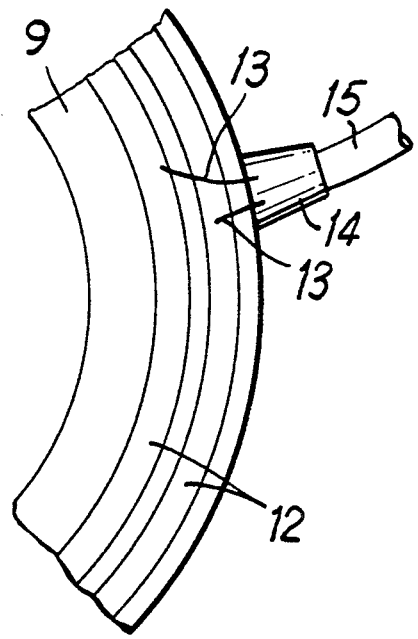
FIG. 3 shows part of a side view of the connection ring with slip rings according to FIG. 1.

The bearing shown in FIG. 1 is a double-row angular roller bearing or rolling bearing with a divided inner ring 1, placed on a fixed shaft 2. A synthetic ring 3 with an embedded ALS sensor 4 is placed on the shoulder of the inner ring shown on the ring-hand side of the drawing. One of the mounting surfaces of the revolving outer ring holds a pulse ring 5 with cell segments 6 distributed over the circumference with activates the ALS sensor 4. The side of the synthetic ring 3 is equipped—as shown more clearly in FIG. 2—with two radially offset electrical contacts 7 which project slightly over the side of the synthetic ring 3 and which have an axial spring action—not further shown here but sufficiently known from electrical wiring techniques. They are furthermore offset in a circumferential direction so that they can be fabricated in a sturdy and, at the same time, contact-free manner. They are electrically connected to the ALS sensor 4. A shoulder 8 of the fixed shaft 2 holds a connection ring 9 made of a synthetic material which is closely fitted to the side wall 10 of the inner ring 1 when the bearing is assembled. The connection ring 9 possesses an axial projecting part 11 which extends into a corresponding recess of the shaft 2 and is therefore secured against turning. The side of connection ring 9 facing the ALS sensor 4 is equipped—as shown more clearly in FIG. 3—with two radially opposite slip rings 12 on which the contacts 7 of the ALS sensor 4 installed on the synthetic ring come to rest. Connecting wires 13 are lead together via a cord reinforcement 14 via a connecting cord 15 to the electronic control not shown here.

Figure 4:
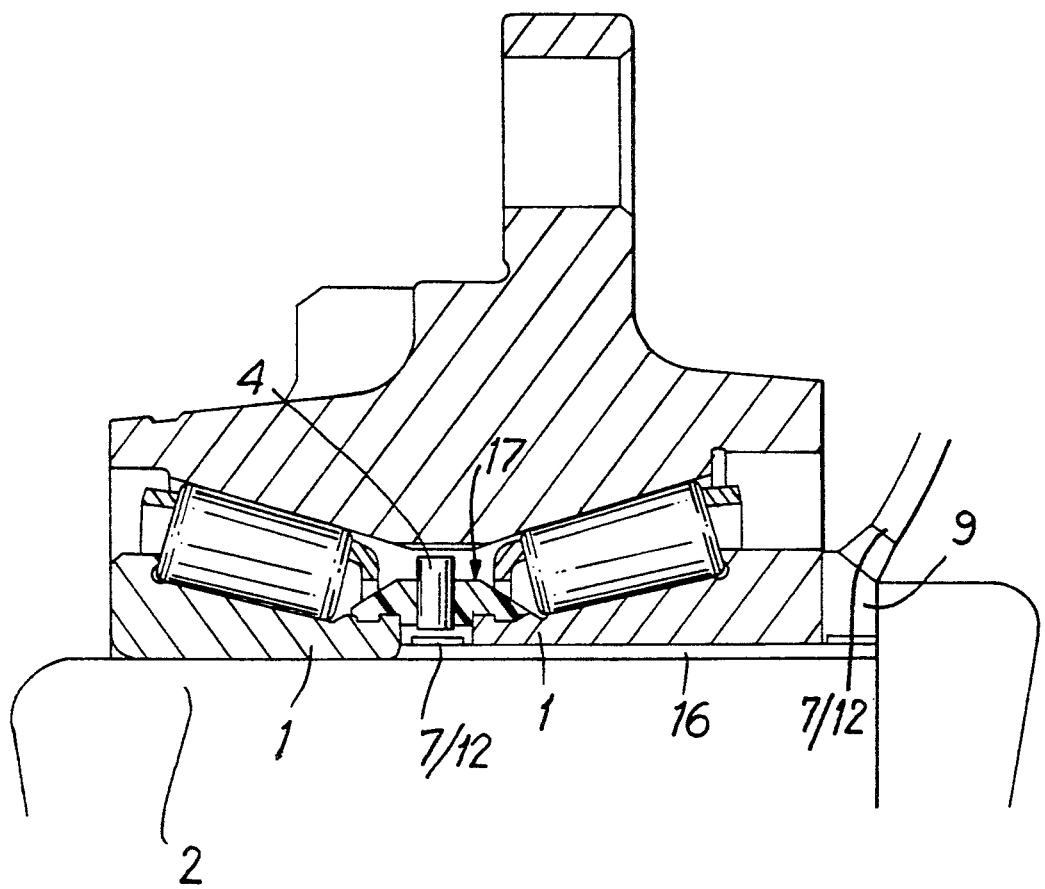
FIG. 4 shows part of a longitudinal section of a wheel bearing with a built-in ALS sensor and a connection ring with slip rings installed on the interior.

The example shown in FIG. 4 is a connection ring 9 equipped with slip rings 12 at the bore surface. The slip rings 12 engage contacts 7 which are installed on a seat casing 16 carrying the inner ring half 1. The seat casing 16 provides an electrical connection via a retaining ring 17 held between the inner ring halves 1 to an embedded ALS sensor 4, which is connected electrically in the same manner via the slip rings 12 and contacts 7. The connecting wires incorporated in the seat casing 16 are electrically insulated with respect to the bearing and the shaft 2.

The connection rings which in the examples are annularly closed may also be radially slotted or divided to allow radial assembly. The connection rings can be secured from falling from the shoulder of the fixed shaft by means of snaps, clamps or other fasteners.

Other modification and variation within the spirit and scope of the invention will be evident to those skilled in the art, and the invention should thus be limited only to the following claims, wherein:

What is claimed is:

1. An electrical connection for an anti-lock sensor on a roller bearing for connection to an electronic control, the electrical connection being installed on a side surface of the roller bearing, comprising first contacts on said roller bearing, and a connection ring mounted coaxially with the roller bearing, said connection ring having second contacts engaging said first contacts, said connection ring being axially insertable with said roller bearing onto a shaft.

2. An electrical connection according to claim 1, wherein said bearing includes a sensor connected to said first contacts, and said second contacts comprise slip rings for connection to said electronic control.

3. An electrical connection for an anti-lock sensor on a roller bearing for connection to an electronic control, the electrical connection being installed on a side surface of the roller bearing, comprising a connection ring installed coaxially with the roller bearing and axially insertable therewith onto a shaft, said sensor and said connection ring comprising contact-carrying elements which include contacts and wherein said contacts of at least one of the contact-carrying elements are slip rings.

4. An electrical connection according to claim 3, wherein said connection ring has circumferentially extending surfaces and wherein said slip rings are installed on one of the circumferentially extending surfaces of said connection ring.

5. An electrical connection according to claim 3 wherein said connection ring has a side surface and wherein said slip rings are installed on the side surface of said connection ring.

* * * * *